United States Patent
Hashimoto et al.

(10) Patent No.: US 6,727,198 B1
(45) Date of Patent: Apr. 27, 2004

(54) INFRARED ABSORBING GLASS FOR REED SWITCH

(75) Inventors: Koichi Hashimoto, Kusatsu (JP); Hiroyuki Kosokabe, Yamagata (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/830,722

(22) PCT Filed: Aug. 30, 1999

(86) PCT No.: PCT/JP99/04685
§ 371 (c)(1),
(2), (4) Date: Apr. 27, 2001

(87) PCT Pub. No.: WO01/16042
PCT Pub. Date: Mar. 8, 2001

(51) Int. Cl.$^7$ .......................... C03C 3/085; C03C 3/091; C03C 3/11; C03C 4/08
(52) U.S. Cl. ............................... 501/66; 501/69; 501/70
(58) Field of Search ............................... 501/66, 69, 70

(56) References Cited

U.S. PATENT DOCUMENTS

| | | | | |
|---|---|---|---|---|
| 3,949,335 A | * | 4/1976 | Morgan | 335/154 |
| 4,001,741 A | * | 1/1977 | Lindig et al. | 335/153 |
| 4,277,285 A | | 7/1981 | Boudot et al. | |
| 5,105,957 A | * | 4/1992 | Mannl | 215/47 |
| 5,121,748 A | * | 6/1992 | Ditz et al. | 600/302 |

FOREIGN PATENT DOCUMENTS

| | | | | |
|---|---|---|---|---|
| JP | 50-50417 | | 5/1975 | |
| JP | 04-310537 | | 11/1992 | |
| JP | 05058671 A | * | 3/1993 | C03C/4/08 |
| WO | WO-9850314 A | * | 11/1998 | |

* cited by examiner

Primary Examiner—David Sample
(74) Attorney, Agent, or Firm—Collard & Roe, P.C.

(57) ABSTRACT

An infra-red absorption glass for a reed switch is suitable for encasement of a reed switch using magnetic wire members made of Fe—Ni based alloy (52 alloy). In the infra-red absorption glass, an infra-red transmittance at a wavelength of 1050 nm is not greater than 10% for a thickness of 0.5 mm and the content of Cl in the glass is not greater than 150 ppm. In the glass, a coefficient of thermal expansion in a temperature range between 30 and 380° C. is preferably $85–100\times10^{-7}/°$ C. In addition, the infra-red absorption glass preferably has a composition consisting essentially of, by weight percent, 60–75% of $SiO_2$, 1–10% of $Al_2O_3$, 0–10% of $B_2O_3$, 3.5–10% of RO (R being one or more selected from Ca, Mg, Ba, Sr, and Zn), 0.5–5% of $Li_2O$, 8–17% of $Na_2O+K_2O$, 2–10% of $Fe_3O_4$.

2 Claims, No Drawings

INFRARED ABSORBING GLASS FOR REED SWITCH

CROSS REFERENCE TO RELATED APPLICATION

Applicants claim priority under 35 U.S.C. §365 of PCT/JP99/04685, filed: Aug. 30, 1999. The international application under PCT article 31(2) was not published in English.

TECHNICAL FIELD

This invention relates to an infra-red absorption glass for a reed switch, which glass is suitable for encasement of a reed switch using magnetic wire members made of Fe—Ni based alloy (52 alloy).

BACKGROUND ART

A reed switch comprises confronting contact points including magnetic wire members and a glass tube enclosing those points and performs open/close operations of the contact points by applying a magnetic field from the outside of the glass tube. The encasement of the magnetic wire members into the glass tube is carried out by heating, softening, and sealing both ends of the glass tube in an inert gas, in a reducing gas, or in a vacuum in the state where the magnetic wire members are inserted in the glass tube. In the heating operation, use is made of a heat source available under the above-mentioned atmosphere, for example, an infra-red radiation type heat source using a halogen lamp with a reflecting plate for light convergence.

Under the above-mentioned circumstances, an infra-red absorption glass specially developed is used as a glass for a reed switch. Presently, use is widely made of the infra-red absorption glass having a characteristic such that an infra-red transmittance at a wavelength of 1050 nm is on the order of 15% to 20% when the glass has a thickness of 0.5 mm.

In the meanwhile, the reduction in size of electronic components is strongly desired as an essential condition in order to achieve the reduction in size and weight of electronic apparatuses which is remarkably accelerated in recent years. For the reed switch, reduction in size similarly proceeds. Accordingly, the reduction in diameter, length, and thickness of the glass tube which determines the size of the reed switch is carried out.

However, as the reduction in diameter, length, and thickness of the glass tube for a reed switch proceeds further, the following problems are caused in a conventional infra-red absorption glass to decrease the process yield and to place a limit in further reduction in size.

A first problem is as follows. Specifically, an infra-red ray from the halogen lamp forms a spot having the spread on order of 10 mm in diameter even if converged. When the center of the infra-red spot is brought into coincidence with the center of a sealing portion of the reed switch using the glass tube having a short length and a small thickness, a peripheral portion of the spot hits and heats the contact points of the switch which should not be heated in its nature. Therefore, it is necessary to intentionally deviate the center of the spot from the center of the sealing portion and to heat the sealing portion by the peripheral portion of the spot. However, the peripheral portion of the spot is low in infra-red energy and is unstable. Accordingly, the sealing requires a long time so that the productivity is decreased. In addition, nonuniformity in sealed pattern is increased so that the yield is deteriorated.

Next, a second problem is as follows. Upon sealing, the glass is in a softened state at about 1000° C. and a glass component is evaporated although in a very small amount. Such evaporated component is again solidified on a surface of metal material and/or of the glass of the reed switch which are present in the vicinity and still relatively low in temperature. In case of the reed switch having a short length, the evaporated glass component is again solidified around the contact points of the switch to thereby cause contact fault (electrical connection defect) of the switch.

In view of the above-mentioned problems, this invention has been made. It is an object of this invention to provide an infra-red absorption glass suitable for efficiently producing a small-sized reed switch.

DISCLOSURE OF THE INVENTION

The present inventors have found out that the problems accompanying the reduction in size of a reed switch can be solved by limiting an infra-red transmittance of a glass to an appropriate lower range and by strictly restricting Cl content included as a small amount of impurity in the glass and propose this invention.

Specifically, an infra-red absorption glass for a reed switch of this invention is characterized in that an infra-red transmittance at a wavelength of 1050 nm is not greater than 10% when the glass has a thickness of 0.5 mm and the content of Cl in the glass is not greater than 150 ppm.

BEST MODE FOR EMBODYING THE INVENTION

Description will be made in detail about this invention.

An infra-red absorption glass for a reed switch of this invention has an infra-red transmittance at a wavelength of 1050 nm which is not greater than 10% when the glass has a thickness of 0.5 mm.

The low infra-red transmittance is a characteristic essential to absorb heat radiation. It is assumed that the infra-red transmittance at a wavelength of 1050 nm exceeds 10% when the glass has a thickness of 0.5 mm. In this event, upon manufacturing a small-sized reed switch using the glass having a small diameter, a short length, and a small thickness, infra-red absorption from a halogen lamp is not sufficient so that an additional time and an extra energy are required for sealing. In addition, since the amount of infra-red rays transmitted through the glass to reach the inside of the reed switch is increased, contact point portions of the switch are heated so that magnetic characteristics would be deteriorated.

Furthermore, in the infra-red absorption glass for a reed switch of this invention, the content of Cl is extremely small.

Cl is contained as one of impurities in raw materials for the glass. If the glass prepared by the use of the above-mentioned raw materials is heated, salt such as NaCl and KCl is liable to evaporate. The evaporated salt is again solidified inside the reed switch to cause a contact fault (electrical connection defect). Therefore, in this invention, the content of Cl in the glass is limited to 150 ppm or less, preferably 100 ppm or less.

The content of Cl being greater than the above-mentioned range will remarkably increase the evaporation of the salt from the glass softened by the heat for sealing. In case of the small-sized reed switch, the salt is solidified in the vicinity of the contact points to cause the contact fault.

It is noted here that F exists as a component similar to Cl. F is sometimes contained as another impurity in the glass raw material and is sometimes positively introduced into the glass because it serves to reduce the viscosity of the glass or has a very strong action as a melting agent. However, if a large amount of F is contained in the glass, the salt such as NaF and KF is evaporated to possibly cause a problem similar to that mentioned in conjunction with Cl. Therefore, the content thereof is preferably limited. In this case, the content of F is desirably not greater than 5000 ppm, in particular, not greater than 1500 ppm.

In addition, it is important that a coefficient of thermal expansion of the glass in a temperature range between 30°

C. and 3800° C. is limited to an extent of 85–100×10$^{-7}$/° C. If the coefficient of thermal expansion is out of the above-mentioned extent, matching with the 52 alloy as magnetic wire members of the reed switch are impossible. This results in a leak (leakage of airtightness) at a sealing portion and, in the worst case, a damage of the glass.

As the glass having the above-mentioned characteristics, use is advantageously made of the infra-red absorption glass having a composition consisting essentially of, by weight percent, 60–75% of $SiO_2$, 1–10% of $Al_2O_3$, 0–10% of $B_2O_3$, 3.5–10% of RO (R being one or more selected from Ca, Mg, Ba, Sr, and Zn), 0.5–5% of $Li_2O$, 8–17% of $Na_2O+K_2O$, 2–10% of $Fe_3O_4$.

In this invention, the reason why the composition of the glass is restricted as described above is as follows.

At first, $SiO_2$ is a main component required to form a frame structure of the glass. If the content is more than 75%, the coefficient of thermal expansion is excessively low and the meltability is deteriorated. If the content is less than 60%, the chemical durability is deteriorated. In this event, the glass would be changed in quality by chemical treatment such as plating in a manufacturing step of the reed switch. In addition, it is impossible to achieve the weathering resistance which assures a long-term reliability as an electronic component.

$Al_2O_3$ has remarkable effects of improving the weathering resistance of the glass and suppressing devitrification upon melting of the glass. However, if the content is more than 10%, melting of the glass is difficult. If the content is less than 1%, the above-mentioned effect can not be obtained.

$B_2O_3$ has effects of promoting melting of the glass and reducing the viscosity of the glass to increase the efficiency of the sealing. However, if the content is more than 10%, the chemical durability is deteriorated.

Furthermore, the evaporation is increased upon melting so that a uniform glass can not be obtained.

CaO, MgO, BaO, SrO, and ZnO represented by RO have effects of lowering the viscosity of the glass and improving the weathering resistance of the glass. However, if the total amount is more than 10%, the devitrification of the glass is increased and the uniform glass is difficult to produce. If the content is less than 3.5%, the above-mentioned effects can not be obtained.

$Li_2O$ has effects of maintaining a high volume resistivity of the glass required as electrical insulation of the reed switch and increasing the coefficient of thermal expansion to some extent. In addition, the effect as a melting agent and the effect of lowering the viscosity are remarkably large. Therefore, if $Li_2O$ is used as an essential component, it is possible to minimize the content of $B_2O_3$ which is a component generally used as a melting agent of the glass but likely to evaporate. However, if the content of $Li_2O$ is more than 5%, the weathering resistance and the devitrification of the glass are unfavorably deteriorated. On the other hand, if the content is less than 0.5%, the above-mentioned effects can not be obtained.

$Na_2O$ and $K_2O$ are components which serve to increase the coefficient of thermal expansion of the glass and to promote the melting of the glass, like $Li_2O$. However, if the total amount of $Na_2O$ and $K_2O$ exceeds 17%, the coefficient of thermal expansion is excessively large and the weathering resistance and the volume resistivity of the glass are remarkably deteriorated. On the other hand, if the content is less than 8%, a predetermined coefficient of thermal expansion can not be obtained. Furthermore, the melting of the glass becomes difficult.

In addition, if the content of each individual component among $Li_2O$, $Na_2O$, and $K_2O$ does not exceed 80% of the total amount of these components, more excellent weathering resistance and high volume resistivity can be obtained by the action of a mixed alkali effect.

$Fe_3O_4$ (Infra-red rays are absorbed by FeO which coexists with $Fe_2O_3$ in the glass depending upon redox. Herein, all iron oxide is represented in terms of $Fe_3O_4$.) is used as an essential component in order to provide the glass with an infra-red absorbability. However, if the content is more than 10%, vitrification becomes difficult. If the content is less than 2%, the infra-red transmittance at a wavelength of 1050 nm can not be reduced to less than 10% when the glass has a thickness of 0.5 mm.

It is noted here that, in the above-mentioned glass, each component such as $ZrO_2$ and $TiO_2$ can be added to 3% for the purpose of adjusting the viscosity of the glass and improving the devitrification and the weathering resistance.

Next, description will be made about a method of manufacturing the infra-red absorption glass for a reed switch of this invention.

First, a batch is prepared so as to obtain a desired composition. At this time, it is important to select or refine and use glass raw materials with a less content of Cl (and F) so that the content of Cl (and F) contained in the glass is less than the above-mentioned range. In addition, a reducing agent may be added in an amount on the order of 0.1–1% with respect to the glass. In this event, it is possible to stably obtain the glass having the infra-red transmittance at a wavelength of 1050 nm which is equal to 10% or less when the glass has a thickness of 0.5 mm.

Next, the batch is melted. Subsequently, the molten glass is formed into a tubular shape and cut into a predetermined length. Thus, the infra-red absorption glass for a reed switch can be obtained.

Next, description will be made in detail about examples of the infra-red absorption glasses manufactured according to this invention.

The following tables 1 and 2 show compositions and characteristics of examples of this invention (Samples Nos. 1 to 7) and comparative examples (Samples Nos. 8 and 9).

Each sample in the following tables 1 and 2 was prepared in the following manner.

First, glass raw materials were blended so as to obtain each composition shown in the tables 1 and 2 and were sufficiently mixed. Subsequently, the mixture was added with carbon as a reducing agent in a ratio shown in the tables, and then melted for four hours at 1500° C. by the use of a platinum crucible. After melting, the melt was poured on a carbon plate and annealed so that each glass sample was prepared.

Next, the infra-red transmittance at a wavelength of 1050 nm for the glass thickness of 0.5 mm, the contents of Cl and F, the coefficient of thermal expansion in a temperature range between 30 and 380° C. were measured and shown in the following tables 1 and 2.

As is obvious from the following tables 1 and 2, each of samples Nos. 1 to 7 as the examples of this invention exhibited the infra-red transmittance less than 8.3% and the content of Cl less than 150 ppm. The coefficient of thermal expansion was 89.8–94.8×10$^{-7}$/° C.

In addition, by the use of the sample glass formed into the tubular shape, evaluation was made of a time required for sealing and deposition of the salt due to the evaporation upon heating. As a result, the time required for sealing was 1.5 second or less for each sample. In addition, in the samples Nos. 1 to 5, the deposition of the salt due to the evaporation was not observed at all. In the samples Nos. 6 and 7, little deposition of the salt was observed by a microscope but was not visually confirmed. As a result of an EPMA analysis, the deposited salt was NaCl in the sample No. 6 and was NaF in the sample No. 7.

On the other hand, the sample No. 8 as the comparative example had an infra-red transmittance as high as 18.8% and therefore requires 3.4 seconds for sealing. In the sample No. 9, the deposition of the salt was visually confirmed because the content of Cl was large. As a result of the EPMA analysis, it was revealed that the deposited salt included NaCl and KCl.

The infra-red transmittance was measured in the following manner. The glass was formed into a plate shape having a thickness of 0.5 mm. Then, both surfaces thereof were subjected to mirror polishing. Thereafter, the transmittance at a wavelength of 1050 nm was measured by the use of a spectrophotometer. The contents of Cl and F in the glass were obtained in the following manner. The glass samples prepared were pulverized and then subjected to alkali fusion, and measured by the use of an ion chromatography. The coefficient of thermal expansion was measured by the use of an automatic recording differential dilatometer as an average coefficient of thermal expansion in a temperature range of 30–380° C. In addition, the time required for sealing was obtained in the following manner. A sample glass tube having the dimension of 1.7 mm in outer diameter, 0.2 mm in thickness, and 8 mm in length was prepared. Thereafter, its tube end was heated by irradiating the infra-red rays emitted from the halogen lamp and converged. Then, the time required to seal the tube end was measured. The presence or absence of the deposition of the salt due to the evaporation was observed in the following manner. In the above-mentioned glass tube softened by heating and sealed, an unheated portion was observed visually and by the use of a stereo microscope (50× magnification). The samples in which the deposition of metal salt was not observed at all were labelled "⊚", the samples in which the metal salt was observed by the stereo microscope but was not visually confirmed, "○", and the samples in which the metal salt was even visually confirmed (=opaqueness was produced), "X" in the following tables 1 and 2.

As described above, the infra-red absorption glass of this invention is excellent in infra-red absorption characteristic and can be efficiently sealed even if it is heated by a peripheral portion of the infra-red spot.

In addition, since no substantial evaporation occurs from the glass, it is prevented that the glass components evaporated are again condensed around the contact of the switch to cause the contact fault. Therefore, it is possible to efficiently produce the small-sized reed switch.

TABLE 1

| | | Present Invention (weight %) | | | | |
|---|---|---|---|---|---|---|
| Sample No. | | 1 | 2 | 3 | 4 | 5 |
| Glass Composition | $SiO_2$ | 71.0 | 70.5 | 68.9 | 63.5 | 65.8 |
| | $Al_2O_3$ | 2.0 | 5.0 | 4.1 | 4.0 | 5.5 |
| | $B_2O_3$ | 1.0 | 0.5 | 1.0 | 1.0 | — |
| | SrO | 1.0 | 1.0 | 1.5 | 1.0 | 2.5 |
| | BaO | 6.0 | 5.0 | 5.0 | 7.0 | 2.2 |
| | ZnO | — | — | — | 1.0 | 4.0 |
| | $Li_2O$ | 2.5 | 3.0 | 3.0 | 1.0 | 4.0 |
| | $Na_2O$ | 4.0 | 9.0 | 8.0 | 9.0 | 5.0 |
| | $K_2O$ | 9.5 | 3.0 | 3.5 | 6.0 | 5.0 |
| | $ZrO_2$ | — | — | — | 0.5 | 1.0 |
| | $Fe_3O_4$ | 3.0 | 3.0 | 5.0 | 6.0 | 5.0 |
| | Reducing Agent | 0.5 | 0.5 | 0.4 | 0.4 | 0.3 |

TABLE 1-continued

| | Present Invention (weight %) | | | | |
|---|---|---|---|---|---|
| Sample No. | 1 | 2 | 3 | 4 | 5 |
| Infre-red transmittance (%) | 8.3 | 7.9 | 6.1 | 3.2 | 4.8 |
| Content of Cl (ppm) | 20 | 20 | 30 | 70 | 60 |
| Content of F (ppm) | 30 | 180 | 40 | 20 | 200 |
| Coefficient of thermal expansion (×10⁻⁷/° C.) | 94.0 | 92.7 | 91.5 | 90.2 | 94.8 |
| Sealing time (second) | 1.5 | 1.5 | 1.0 | 1.0 | 1.0 |
| Deposition of salt due to evaporation | ⊚ | ⊚ | ⊚ | ⊚ | ⊚ |

TABLE 2

| | | Present invention (weight %) | | Comparative Example | |
|---|---|---|---|---|---|
| Sample No. | | 6 | 7 | 8 | 9 |
| Glass Composition | $SiO_2$ | 69.0 | 68.9 | 72.2 | 71.0 |
| | $Al_2O_3$ | 5.0 | 4.1 | 2.0 | 2.0 |
| | $B_2O_3$ | 2.5 | 1.0 | 1.0 | 1.0 |
| | SrO | 1.0 | 1.5 | 1.0 | 1.0 |
| | BaO | 5.0 | 5.0 | 6.0 | 6.0 |
| | ZnO | — | — | — | — |
| | $Li_2O$ | 2.5 | 3.0 | 2.5 | 2.5 |
| | $Na_2O$ | 12.0 | 8.0 | 4.0 | 4.0 |
| | $K_2O$ | — | 3.5 | 9.5 | 9.5 |
| | $ZrO_2$ | — | — | — | — |
| | $Fe_3O_4$ | 3.0 | 5.0 | 1.8 | 3.0 |
| | Reducing Agent | 0.5 | 0.4 | 0.08 | 0.5 |
| Infre-red transmittance (%) | | 7.9 | 8.2 | 18.8 | 8.3 |
| Content of Cl (ppm) | | 150 | 50 | 60 | 230 |
| Content of F (ppm) | | 20 | 5800 | 50 | 85 |
| Coefficient of thermal expansion (×10⁻⁷/° C.) | | 89.8 | 93.5 | 94.0 | 94.0 |
| Sealing time (second) | | 1.5 | 1.5 | 3.4 | 1.5 |
| Deposition of salt due to evaporation | | ○ | ○ | ⊚ | x |

Industrial Applicability

As described above, the infra-red absorption glass according to this invention is most suitable for the sealing glass of the reed switch.

What is claimed is:

1. An infra-red absorption glass for a reed switch, the glass having a composition consisting essentially of, by weight percent, 60–75% of $SiO_3$, 1–10% of $Al_2O_3$, 0–10% of $B_2O_3$, 3.5–10% of RO (R being one or more elements selected from Ca, Mg, Ba, Sr, and Zn, 0.5–5% of $Li_2O$, 8–17% of $Na_2O+K_2O$, and 2–10% of $Fe_3O_4$, wherein an infra-red transmittance at a wavelength of 1050 nm is not greater than 10% for a thickness of 0.5 nm and the content of Cl in said glass is 20–150 ppm.

2. An infra-red absorption glass for a reed switch as claimed in claim 1, wherein a coefficient of thermal expansion in temperature range between 30 and 380° C. is 85–100×10⁻⁷/° C.

* * * * *